(12) United States Patent
Achard et al.

(10) Patent No.: US 9,005,455 B2
(45) Date of Patent: Apr. 14, 2015

(54) DEVICE AND A METHOD FOR SEPARATING A SUSPENSION

(75) Inventors: Jean-Luc Achard, Grenoble (FR); Elodie Sollier, Grenoble (FR); Yves Fouillet, Voreppe (FR); Hervé Rostaing, Le Versoud (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 659 days.

(21) Appl. No.: 12/465,149

(22) Filed: May 13, 2009

(65) Prior Publication Data

US 2009/0283474 A1   Nov. 19, 2009

(30) Foreign Application Priority Data

May 13, 2008 (FR) ...................................... 08 02574

(51) Int. Cl.
*B01D 17/038* (2006.01)
*B01D 21/26* (2006.01)
(Continued)

(52) U.S. Cl.
CPC ......... *B01D 21/265* (2013.01); *B01L 3/502753* (2013.01); *B01D 21/0087* (2013.01); *B01D 2221/10* (2013.01)

(58) Field of Classification Search
USPC .......... 210/143, 223, 259, 512.1–512.3, 781, 210/782, 787–789, 767, 513, 521, 522, 210/538–540, 800–803, 511, 634, 639, 210/805; 366/132, 137, 150.1, 151.1, 366/336–340; 209/725–729, 732, 734, 155; 55/434, 447, 462; 204/450, 451, 600, 204/601; 422/72, 504, 506, 527, 533; 436/45, 177, 178
See application file for complete search history.

(56) References Cited

U.S. PATENT DOCUMENTS 1,438,048 A * 12/1922 Marsh ............................ 95/253
1,747,155 A *  2/1930 Birdsall ........................ 210/787
(Continued)

FOREIGN PATENT DOCUMENTS

JP       2007-534472 A    11/2007

OTHER PUBLICATIONS

Search Report from French Priority Application No. 08 02574, Filed May 13, 2008.
(Continued)

*Primary Examiner* — Joseph Drodge
(74) *Attorney, Agent, or Firm* — Alston & Bird LLP

(57) ABSTRACT

A device for extracting a liquid phase from a suspension, the device being characterized in that it comprises: a main duct for conveying a flow of said suspension, the duct being of a length that is sufficient to enable a layer of said suspension to develop that is depleted in solid phase; flow disturbance means for disturbing the flow of said suspension, said means being provided in the main duct and being adapted to cause at least one recirculation vortex to form so as to increase locally the thickness of said depleted layer; and liquid extraction means disposed in a region of the device where said suspension is enriched in liquid phase as a result of said recirculation vortex.

A method of extracting a liquid phase from a suspension, the method comprising injecting said suspension into such a device at a flow rate suitable for causing at least one recirculation vortex to be formed, and extracting a fraction of said suspension that is enriched in liquid as a result of said vortex.

17 Claims, 7 Drawing Sheets

(51) Int. Cl.
*B01D 21/00* (2006.01)
*B01L 3/00* (2006.01)

(56) References Cited

U.S. PATENT DOCUMENTS

| | | | | |
|---|---|---|---|---|
| 2,076,380 | A * | 4/1937 | Marsh | 210/532.1 |
| 3,493,120 | A * | 2/1970 | Milner | 210/512.1 |
| 4,001,121 | A * | 1/1977 | Bielefeldt | 210/512.3 |
| 4,048,070 | A * | 9/1977 | Propp | 210/85 |
| 4,702,846 | A * | 10/1987 | Ryynanen | 210/788 |
| 6,569,323 | B1 * | 5/2003 | Pribytkov | 210/181 |
| 7,473,216 | B2 * | 1/2009 | Lolachi et al. | 494/45 |
| 7,896,169 | B2 * | 3/2011 | Levitt et al. | 210/512.1 |
| 2005/0239910 | A1 | 10/2005 | Jarosch et al. | |
| 2005/0249641 | A1 * | 11/2005 | Blankenstein et al. | 422/102 |
| 2006/0078873 | A1 * | 4/2006 | Ogawa et al. | 435/4 |
| 2006/0118479 | A1 | 6/2006 | Shevkoplyas et al. | |
| 2006/0270964 | A1 | 11/2006 | Viole et al. | |
| 2008/0128331 | A1 * | 6/2008 | Lean et al. | 209/155 |
| 2009/0114607 | A1 * | 5/2009 | Lean et al. | 210/779 |
| 2009/0139938 | A1 * | 6/2009 | Larnholm et al. | 210/788 |

OTHER PUBLICATIONS

Faivre Magalie et al: "Geometrical focusing of cells in a microfluidic device: an approach to separate blood plasma"; Biorheology, Elsevier Science Ltd., Oxford, GB; vol. 43, No. 2; Jan. 1, 2006; pp. 147-159; XP008097626.

Park J et al: "Continuous Plasma Separation Form Whole Blood Using Microchannel Geometry"; May 12, 2005; Microtechnology in Medicine and Biology, 2005. 3$^{rd}$ IEEE/EMBS Special Topic Conference on Honolulu, HI USA May 12-15, 2005, Piscataway, NJ, USA, IEEE, pp. 8-9; XP010886919.

Chui, D.T., *Cellular Manipulations in Microvortices*, Anal Bioanal Chem, vol. 387 (2007) pp. 17-20.

Ookawara, S. et al., *Numerical Study on Development of Particle Concentration Profiles in a Curved Microchannel*, Chem. Engineering Science 61 (2006) pp. 3714-3724.

Shelby, J.P. et al., *High Radial Acceleration in Microvortices*, Nature, vol. 425, (2003), p. 38.

Shelby, J.P. et al., *High Radial Acceleration in Microvortices*, Nature, vol. 425 (2003).

\* cited by examiner

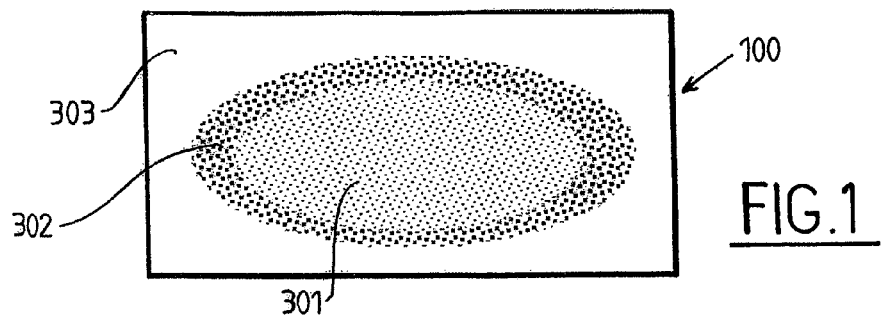
FIG.1
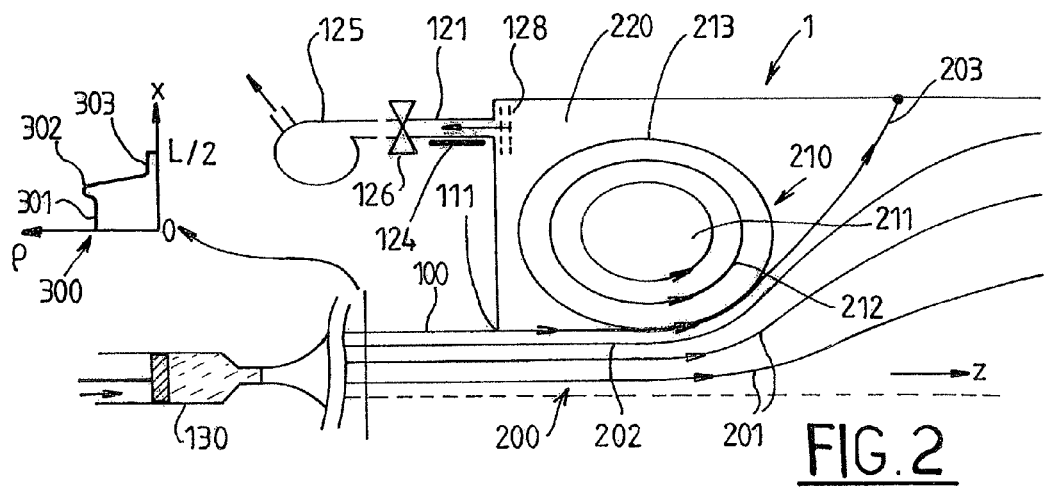
FIG.2
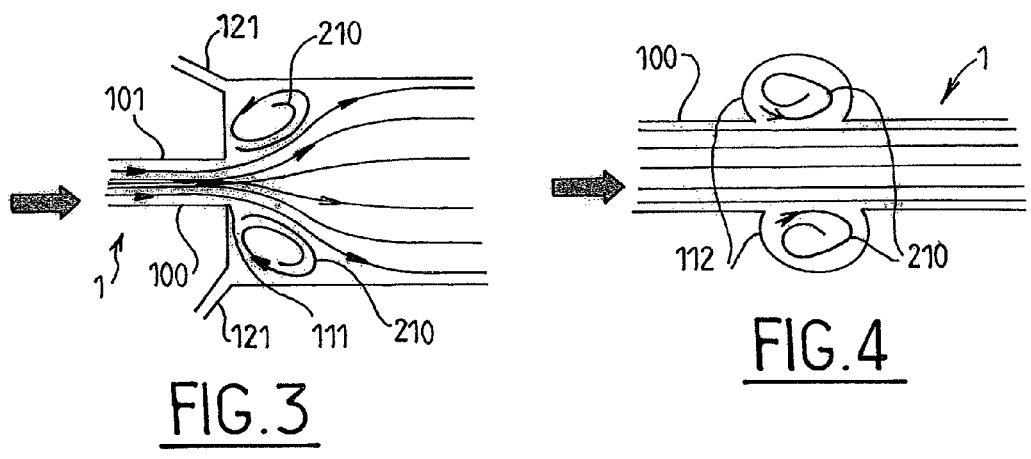
FIG.3
FIG.4

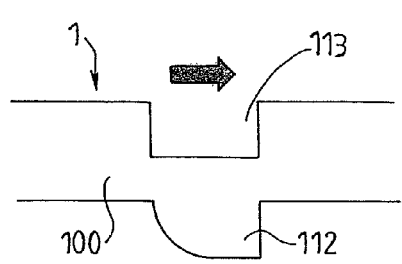
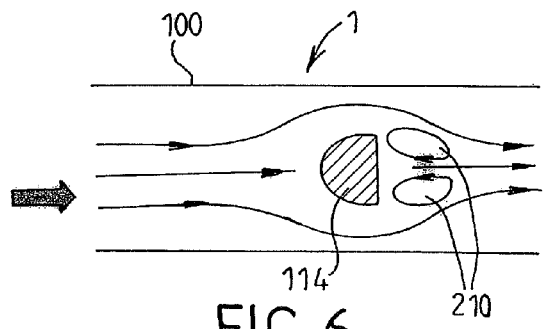
FIG.5   FIG.6
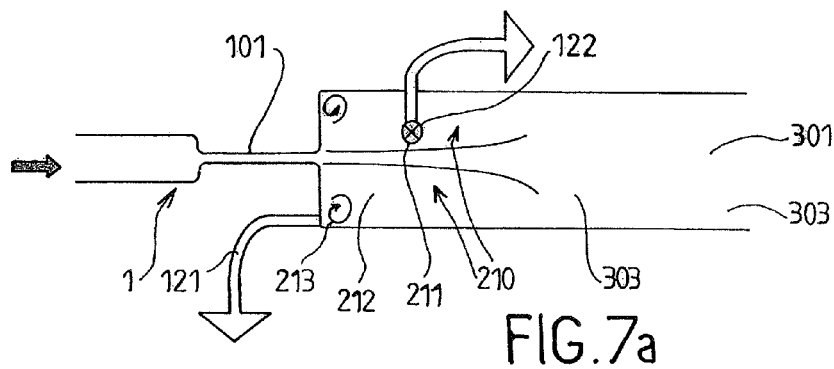
FIG.7a
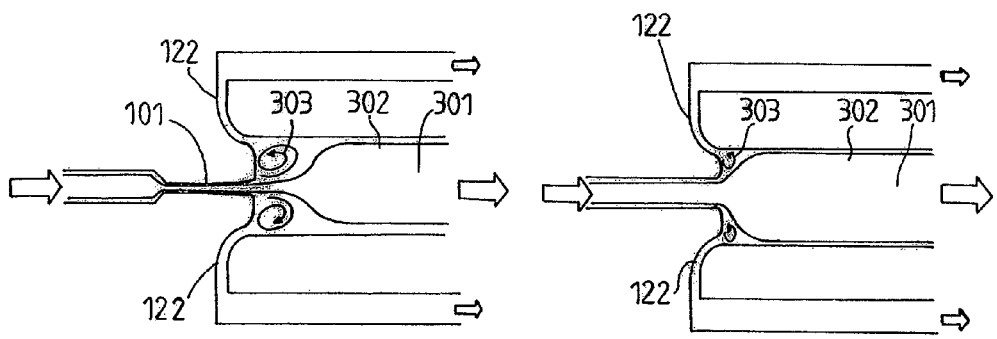
FIG.7c   FIG.7b

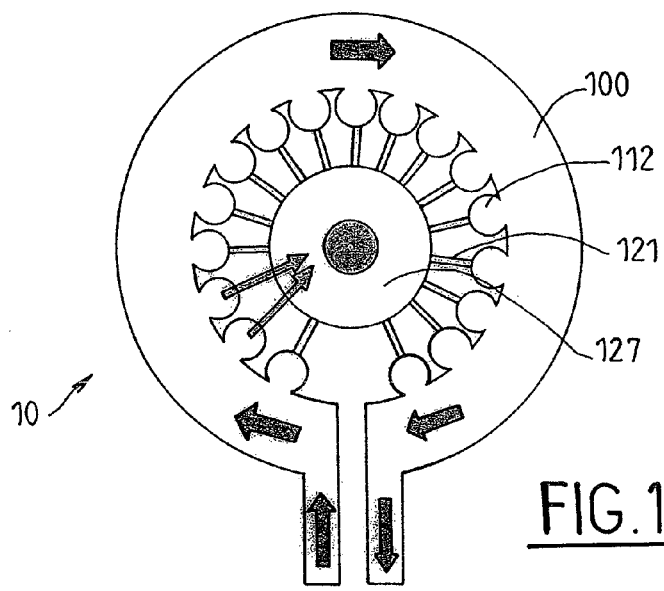
FIG.11
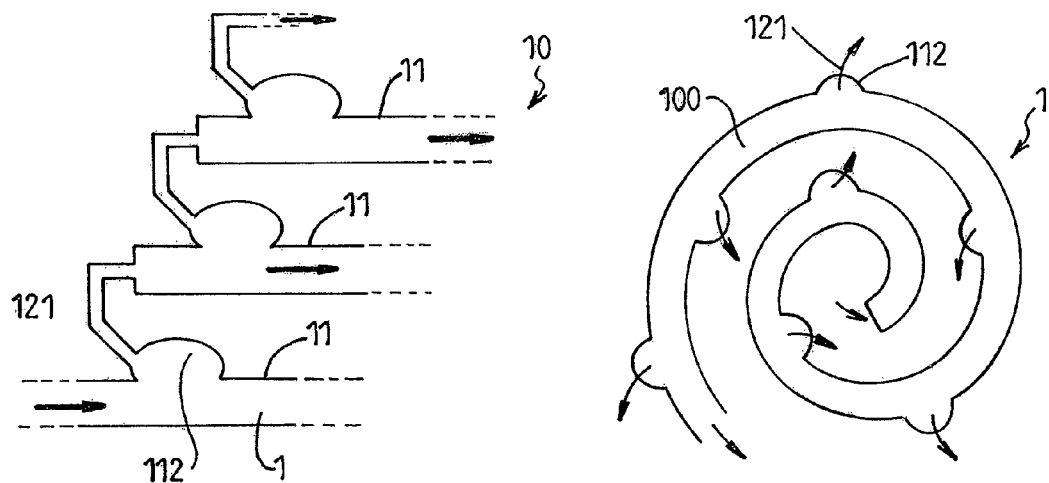
FIG.12
FIG.13

DEVICE AND A METHOD FOR SEPARATING A SUSPENSION

CROSS REFERENCE TO RELATED APPLICATION

This application claims priority from French Application No. 08 02574, filed May 13, 2008, which is hereby incorporated herein in its entirety by reference.

FIELD OF THE INVENTION

The invention relates to a device and a method for separating a suspension, and more precisely to a device and a method for extracting a liquid phase from a suspension.

The invention applies in particular to extracting blood plasma.

BACKGROUND OF THE INVENTION

Blood is traditionally fractioned into cells and plasma by being centrifuged in systems of macroscopic dimensions. More recently, microfluidic techniques have also been developed.

In the field of microsystems, the technique in most widespread use is filtering. Filters are placed perpendicularly to the flow, with pores of dimensions that are optimized for retaining the particles, thereby recovering a fraction of the liquid phase. The main limitation of such techniques, when used with a biological solution, lies in the high deformability of certain cells (in particular red corpuscles in blood). The pores clog quickly, particularly with a solution that is highly concentrated, and the cells end up by lysing.

Another technique consists in performing separation by centrifuging at microfluidic scale, by injecting the suspension into a duct in the form of a spiral or a bend. Nevertheless, the secondary flows (Dean cells) that develop under such conditions tend to mix the particles that it is desired to separate from the liquid fraction. On this topic, reference can be made to the article by S. Ookawara, D. Street, and K. Ogawa entitled "Numerical study on development of particle concentration profiles in a curved microchannel", Chem. Engineering Science 61 (2006), pp. 3714-3724.

One of the emerging techniques is extracting from a depleted zone. That technique is based on the fact that particles in suspension injected into a straight duct are subjected to non-uniform lateral migration as a result of shear forces; a particle-free zone thus appears at the edge of the channel followed by a superconcentrated ring surrounding a central zone in which concentration is uniform.

An application of that technique to extracting blood plasma is described in the article by M. Faivre, M. Abkarian, K. Bichraj, and H. Stone entitled "Geometrical focusing of cells in a microfluidic device: an approach to separate blood plasma", Biorheology (2006) 43: pp. 147-159.

The main limitation of that technique is that any action exerted on the flow (e.g. to extract the plasma) disturbs it. Furthermore, the depleted zone phenomenon depends on flow conditions (liquid viscosity, rheological characteristics of the particles), which are conditions that vary greatly amongst patients and blood pathologies.

SUMMARY OF THE INVENTION

An object of the invention is to provide a microfluidic technique for separating a suspension that does not present at least some of the drawbacks of the prior art.

The technique of the invention makes use of the separation power of the recirculation vortices that appear when the flow of a fluid in a duct is disturbed by a geometrical singularity. Such singularities may be cavities opening out into the duct, sudden enlargements, sudden constrictions, or any obstacle that makes a sudden change varying the section of the duct. The singularities are placed in such a manner as to be connected to the flow via a depleted layer. Their function, so to speak, is to amplify the depletion of the layer at a point.

The separation power of recirculation vortices is already described in the article by J. P. Shelby, D. S. W. Lim, J. S. Kuo, and D. T. Chiu entitled "High radial acceleration in microvortices", Nature (2003) 425, and more recently in the article by D. T. Chui entitled "Cellular manipulations in microvortices", Anal Bioanal Chem (2007) 387: pp. 17-20. Those articles mention the possibility of using this separation power for sorting particles of different densities. Nevertheless, extracting the liquid phase of the suspension is not envisaged.

Compared with all conventional fractioning techniques, extracting plasma by making use of recirculation vortices coupled to a depleted zone in a microfluidic system is particularly advantageous. Specifically:

The separation effect occurs regardless of the kind of particle contained in the suspension (rigid or deformable, spherical or ellipsoidal, . . . ), providing the density of the particle is greater than the density of the medium.

The phenomenon is robust in the face of possible disturbance of the flow.

The mechanisms involved are simpler to control.

The phenomenon makes it possible to obtain particle-depleted zones that are of large dimensions, thereby enabling a high extraction yield to be achieved, particularly if extraction is repeated along a duct.

In accordance with the invention, these advantages can be obtained by means of a device for extracting a liquid phase from a suspension, the device comprising a main duct for conveying a flow of said suspension, the duct being of a length that is sufficient to enable a layer of said suspension to develop that is depleted in solid phase; flow disturbance means for disturbing the flow of said suspension, said means being provided in the main duct and being adapted to cause at least one recirculation vortex to form so as to increase locally the thickness of said depleted layer; and liquid extraction means disposed in a region of the device where said suspension is enriched in liquid phase as a result of said recirculation vortex.

In particular embodiments of the invention:

The device may also include injection means for injecting a suspension into the main duct at a rate that is appropriate for causing at least one recirculation vortex to form at said flow singularity.

Said liquid extraction means may be arranged to extract a liquid-phase-enriched fraction of said suspension from a central region of said vortex. In a variant, it may be arranged in such a manner as to extract a liquid-phase-enriched fraction of said suspension from the outside of said vortex, or from a peripheral region thereof.

Said liquid extraction means may be arranged to extract said liquid-phase-enriched fraction in a direction that is perpendicular to the plane of the vortex. In a variant, it may be arranged in such a manner as to extract said liquid-phase-enriched fraction in a direction that lies in the plane of the vortex and that is oriented rearwards relative to the flow direction of the suspension in the main duct.

Said means for disturbing the flow of said suspension may be selected from: a sudden enlargement of said main duct; a cavity opening out into a side wall of said main duct; and a non-streamlined obstacle placed in the lumen of said main duct.

Said duct may be in a spiral or may present a bend or curve, and said flow disturbance means may be a cavity opening out into a side wall of said main duct and located on the outside of the bend.

A constriction may be provided in said main duct upstream from said flow disturbance means in order to increase the thickness of said solid-phase depleted layer.

Said liquid extraction means may comprise a secondary duct for continuously extracting a liquid-phase-enriched fraction of said suspension. In particular, said liquid extraction means are adapted to extract a liquid-phase-enriched fraction of said suspension via said secondary duct with the help of a micropump, with it being possible to base the operation of the pump on various physical principles, and in particular on a capillary or an electro-capillary effect, an electrohydrodynamic or a magneto-hydrodynamic effect, or a temperature gradient. Advantageously, a filter may be provided at the inlet of said secondary duct.

In a variant, the device may include at least one hydrophilic cavity for discontinuously extracting a liquid-phase-enriched fraction of said suspension.

Means may be provided for activating and deactivating liquid extraction on command.

The liquid extraction means may be arranged symmetrically on either side of said main duct.

Such a device may include a plurality of flow disturbance means for disturbing the flow of the suspension and disposed along the duct; and a plurality of liquid extraction means associated with said flow disturbance means. The device may also include means for mixing said suspension, said means being interposed between the various flow disturbance means.

Such a device may include a plurality of individual devices connected in series in such a manner that the liquid extracted by one of said devices is injected to the inlet of an adjacent device.

The main duct may be of the microfluidic type and may present transverse dimensions lying in the range 10 micrometers (µm) to 10 millimeters (mm).

Such a microfluidic device advantageously presents geometry of planar type.

In another aspect, the invention provides a method of extracting a liquid phase from a suspension, the method comprising: injecting said suspension into a device as described above at a rate that is suitable for causing at least one recirculation vortex to be formed downstream from said or each flow singularity, the or each vortex locally increasing the thickness of a layer of said suspension that is depleted in solid phase; and extracting a fraction of said suspension that is enriched in liquid as a result of said recirculation vortex(ices).

BRIEF DESCRIPTION OF THE DRAWINGS

Other characteristics, details, and advantages of the invention appear on reading the following description made with reference to the accompanying drawings given by way of example, and in which:

FIG. 1 shows the lateral migration of particles in a suspension under the effect of superconcentration of the particles in a ring around the longitudinal axis of a rectilinear duct;

FIG. 2 shows the principle on which the invention is based;

FIGS. 3 to 7 show various singularities in a flow that can be used for implementing the invention;

FIGS. 7a, 7b, 7c, and 8 show the mechanisms whereby a constriction in the main duct, or else a curve, can assist in separating a suspension;

FIGS. 9 to 13 show complex devices each constituted by a plurality of individual devices connected together in parallel (FIGS. 9 to 11 and 13) or in series (FIG. 12);

DETAILED DESCRIPTION

Figure 8:
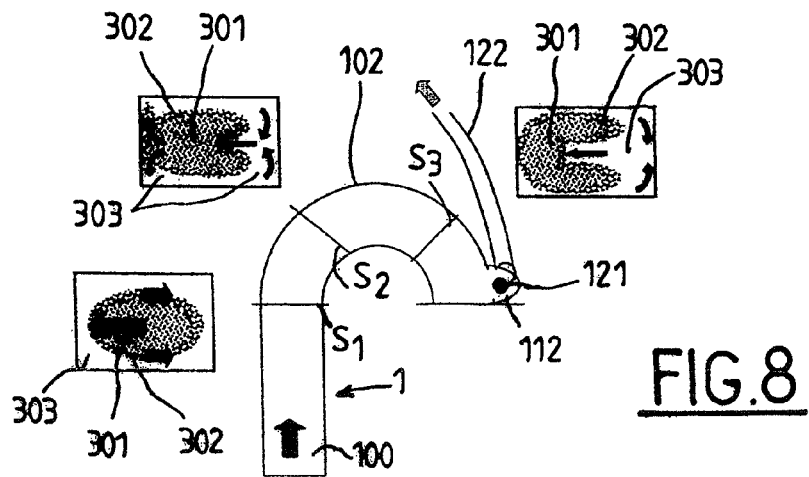

The recirculation phenomenon is well known in fluid mechanics. It appears at geometrical singularities that affect channels, tubes, capillaries, etc. in which a fluid flows, and referred to collectively by the generic term "ducts". In particular, the singularities may be constituted by cavities that open into the duct, sudden enlargements, sudden constrictions, or indeed obstacles internal to the duct.

When a suspension of particles is injected, this phenomenon is manifested by the appearance of a main vortex (possibly associated with marginal vortices that are much smaller). The main vortex occupies the main portion of the extent of the singularity. It is driven via a fluid interface that separates it from the axial flow in the duct. Each particle or cell (that should be heavier than the surrounding liquid) that is located in the main vortex is subjected to two opposing forces: a centrifugal force tending to move it away from the center of the vortex, and a lift force moving it away from the wall. For a particle of sufficient mass $M=\rho V$ (where $\rho$ is its density and V is its volume), centrifugal force predominates over lift force, which depends solely on size and is proportional to $V^{1/3}$ of the particle, thereby enabling it to pass through the driving fluid interface and thus to be no longer trapped within the vortex; the particle is then ejected. Other particles remain blocked in a ring centered on the axis of the vortex, thus leaving one depleted zone in the center of the vortex and another beside the wall. It is therefore possible to envisage sorting blood between small cells that are light and large cells that are heavier. For example, a red blood corpuscle has a mean diameter of 7 µm for a relative density of 1.098, while a white corpuscle has a diameter lying in the range 9 µm to 15 µm for a relative density lying in the range 1.06 to 1.09.

In the prior art it is known that when blood flows along a rectilinear duct, the red corpuscles, cells that are ellipsoidal and deformable, are subjected to a lift force that tends to move them away from the wall. FIG. 1 shows that after flowing a certain distance, the profile of corpuscles in solution within a rectilinear duct 100 of rectangular section comprises: a particle-free zone 303 close to the walls; a ring 302 centered on the longitudinal axis of the duct and in which corpuscles are observed to be superconcentrated; and a central zone 301 where corpuscle concentration is relatively uniform and significantly lower than in the ring 302. The superconcentration of corpuscles in the ring 302 is initially zero and it increases with flow distance until it stabilizes after a limit distance of value that depends on the characteristics of the suspension (in particular its particle concentration and the deformability of the particles) and on the characteristics of the flow. Typically the limit distance is of the order of 1 mm to 50 mm for a duct of the microfluidic type.

FIG. 2 is a fragmentary section view of a device 1 of the invention. Such a device comprises a duct 100 having a suspension 200 of particles injected therein by means of a syringe 130 flowing along a longitudinal direction z. The graph 300 on the left-hand side of the figure shows the profile of particle distribution in the transverse direction x; as explained above, the concentration ρ of particles has a value that is approximately constant in the central region 301 of the flow and takes a value that is very small in a region 303 close to the wall of the duct, reaching zero on contact with said wall (x=L/2, where L is the width of the duct). The regions 301 and 303 are separated by a layer 302 in which particle concentration reaches a peak.

The shape of the cross-section of the duct 100 is generally unimportant: for example it may be square, rectangular, or even circular, even though it is more difficult to make a duct of circular section. The device is of the microfluidic type, and thus the transverse dimensions of the duct lie approximately in the range 10 µm to 10 mm. Overall, the device may have dimensions of the order of a few square centimeters.

In the example of FIG. 2, the duct 100 presents a sudden enlargement 111, where its width preferably increases by a factor of 2 to 8, thereby causing a recirculation vortex 210 to form. Three categories of flow line can be seen. Firstly there are flow lines 201 accompanied with the regions 301 and 302 of the flow that are richer in particles, these lines spreading out in regular manner on passing from the zone of small section to the zone of large section. Then there are flow lines 212 that are looped in the recirculation zone 210. Between the two above-mentioned zones, there are flow lines 202 coming from the depleted peripheral layer 303. One of these lines is adjacent to the superconcentrated ring. Another one of these lines 203, coming from the edge of the sudden enlargement 111, is adjacent to the recirculation zone 210.

The rate at which the suspension is injected must be sufficient to enable recirculation vortices to form. For example, with blood and a duct having a width of a few hundreds of micrometers, such vortices appear from flow rates of the order of 100 microliters per minute (µL/min). The suspension may be injected by means of a syringe pusher, as shown in the figure, or by any suitable pump.

As explained above, particles denser than the liquid concentrate in a ring 212 of the vortex. The center 211 of the vortex, its periphery 213, and the outer zone 220 are particularly rich in liquid and depleted in particles. Extraction means, generally in the form of a secondary duct, can therefore be provided in one of those zones in order to extract a fraction of the suspension that is significantly enriched in liquid phase. In FIG. 2, the extraction means comprise a channel 121 extending in a direction substantially opposite to the flow direction of the suspension along the main duct 100.

Extracting the liquid-enriched phase is a critical element of the technique of the invention. It is most important that it does not destabilize or attenuate recirculation: for example, pumping too hard might press the flow against the wall and cause the vortex to disappear. For this purpose, it is possible to control the extraction rate by means of a syringe pusher or a pressure controller, and/or to dimension the extraction ducts so as to ensure that they present sufficiently high resistance to fluid flow.

Typically, the extraction rate needs to be of the order of a few nanoliters per minute (nL/min) to a few µL/min. In any event, the flow rate best suited to each particular shape needs to be estimated experimentally or by simulation, so as to avoid disturbing the flow while nevertheless enabling the extraction yield to be sufficient.

To ensure that extraction does not disturb the flow, it is also preferable for the extraction duct to be fine and long, so as to present resistance to fluid flow that is higher than that of the main duct. The exact dimensions need to be defined experimentally or by simulation, depending on the shape used.

The secondary duct for extraction may be disposed essentially in two locations: on the outside (or in a peripheral region) of the vortex, as shown in FIG. 2, or at the center thereof. Extraction from the center of the vortex is particularly advantageous, since that is the location where separation is the most complete.

The secondary duct may be substantially parallel to the plane of the vortex, and preferably extends rearwards relative to the flow direction of the suspension in the main duct. This is the solution shown in FIG. 2, which is found to be the most advantageous when the liquid is extracted from the periphery of the vortex.

In a variant, the secondary duct (122 in FIG. 7a) may be disposed perpendicularly to the plane of the vortex. It will be understood that this alternative solution serves to minimize the disturbance to the flow when the liquid is extracted from the center thereof. In a preferred embodiment of the invention, the device is made using planar technology by etching a substrate or by molding; under such circumstances, the duct that extends perpendicularly to the vortex takes the form of a well extending orthogonally to the plane of the device.

Extracting the liquid through the secondary duct 121 or 122 may be performed with the help of a pump 125, preferably a micropump making use of a pressure difference between the main duct and the extraction duct, as a result of energy being delivered, which may be done in various ways. Thus, the micropump may make use of a temperature difference, a difference in electric potential, or indeed a magnetic field, without this list being exhaustive.

It is also possible to use hydrodynamic extraction. Accurate control over head losses is then necessary in order to obtain good equilibrium between injection and extraction so as to avoid disturbing the vortex.

Figure 10:
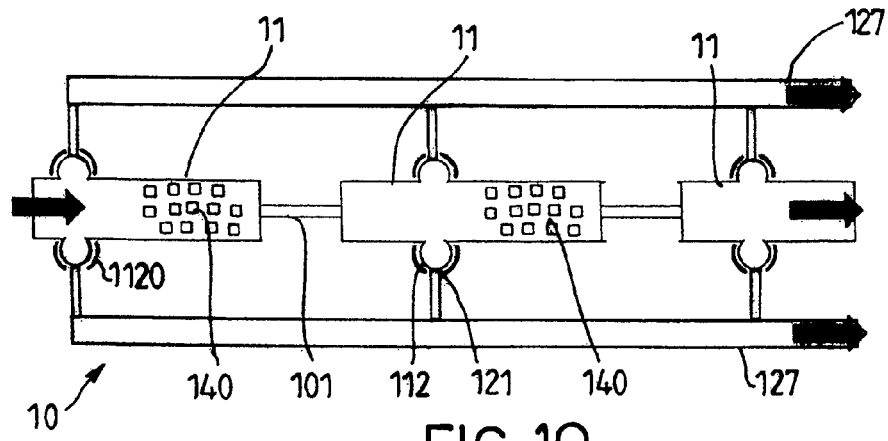

Extraction can also take place discontinuously, by making use of cavities. The cavities may be hydrophilic. In this embodiment, the extracted liquid phase is maintained in the cavities until a controlled release step. For example, FIG. 10 shows cavities 112 with electrodes 1120 located on the bottoms thereto. Activating the electrodes prior to launching the extraction flow makes the cavities hydrophilic and enables them to retain the liquid phase. Deactivating the electrodes enables said liquid phase to be released. This release may be facilitated by providing electrodes also in the extraction ducts 127.

In general, it is appropriate to start extraction only once the flow through the device has stabilized. For this purpose, it is possible to provide valves 126 for selectively opening and closing the secondary duct. The valves may be actuated by a pneumatic system; they may also be hydrophilic and activatable starting from a certain pressure level. When extraction takes place by electrocapillarity, electrodes 124 modify the hydrophilic/hydrophobic nature of the duct so as to enable or prevent liquid extraction. Similarly, with discontinuous extraction, it is possible to control the hydrophilic nature of the cavities electrically.

As shown in FIG. 3, the enlargement 111 in the main duct is preferably symmetrical relative to a longitudinal axis thereof; thus, two recirculation vortices can be used for separating the suspension. This makes it possible to double the rate at which the liquid phase is extracted without any need to increase the pumping rate through each secondary duct, where that could disturb the vortices 210.

In the examples of FIGS. 2 and 3, an enlargement of the main duct is used for disturbing the flow of the suspension and for giving rise to a recirculation vortex. In a variant, other flow-disturbing means could be used:

a cavity 112 opening out in a side wall of the main duct, or preferably two cavities placed symmetrically facing each other (FIG. 4);

a cavity 112 opening out into a side wall of the main duct, with a projection 113 from the opposite wall facing it (FIG. 5); or a non-streamlined obstacle 114 placed in the lumen of the main duct (FIG. 6).

When cavities 112 are used, their dimensions (diameter for cavities that are approximately circular) need to be determined in such a manner as to avoid excessively disturbing the flow in the main duct. Typically, these dimensions lie in the range a few micrometers to a few millimeters.

In particular when the suspension for separation is a biological suspension such as blood, care must be taken to avoid damaging the cells (in particular red corpuscles in blood). Thus, the cavities 112 or the obstacle 114 should preferably not have sharp edges.

It may be advantageous to modify the flow profile upstream from the recirculation vortices in order to accentuate the separating power thereof. For example, a geometrical constriction 101 in the main duct causes the particle-depleted side layer of the flow to spread (303). Thus, fewer particles become detached from the main flow in order to join a vortex. This effect is shown in FIG. 7a which also shows how the liquid-enriched phase can be extracted equally well from the peripheries of the vortices or from their centers (secondary ducts 121 and 122).

A comparison of FIGS. 7b and 7c shows the advantage provided by introducing a constriction in the main duct. The plasma extraction rate is 9% for the example of FIG. 7b and 19% for that of FIG. 7c.

These three examples relate to injecting human blood diluted to 1/20 with a phosphate buffer saline diluent.

To be effective and to increase significantly the particle-depleted layer, the geometrical constriction needs to be as fine and as long as possible. Widths of less than 20 μm should nevertheless be avoided since the cells then become confined, deform, and may be disturbed (lysis, transcriptome modification, . . . ). For widths greater than 100 μm, no significant effect is observed. The length of the constriction should typically lie in the range 50 μm to 1 mm.

If the recirculation vortex is caused by a downstream cavity, the cavity needs to be placed at a distance that is far enough from the constriction (typically at least 200 μm) to ensure that the depleted layer has stabilized.

This coupling of the effects of constriction and recirculation can advantageously be used to sort light particles and heavy particles, in particular white corpuscles and red corpuscles.

Since white corpuscles are not deformable, they are distributed across the entire section of the duct; not only in those regions (ring and central zone) of the flow in which the red corpuscles concentrate, but also in the layer that is depleted in red corpuscles. After passing through the constriction, the layer that is depleted (of red corpuscles) is enlarged compared with its size prior to the constriction. Because the white corpuscles are not deformable, they are unaffected by the reduction in the superconcentration ring, and they are therefore to be found in greater numbers in the new depleted layer.

Passage via recirculation vortices (in a corner or a cavity) therefore enables plasma to be collected that is richer in white corpuscles and enables the corpuscles to be retained, while excluding the red corpuscles that might penetrate therein, by acting both on the flow rate involved and on the geometrical properties of the singularity. Extracting this plasma that is rich in white corpuscles opens the way to subsequent separation of the white corpuscles in devices designed for this purpose. Once the plasma rich in white corpuscles has been selected in recirculation vortices, it is also possible to envisage excluding white corpuscles, once more by accurate control over flow rates and shapes.

A bend in the main duct 100 can also assist in separating the suspension. It is known (see the above-mentioned article by S. Ookawara et al.) that when a fluid flows in a curved channel, secondary flows known as "Dean cells" develop in a plane that extends transversely relative to the flow direction. When this fluid is a suspension, these secondary flows tend to move particles away from the wall situated on the outside of the bend. This effect is visible in FIG. 8 in detail views representing successive cross-sections of the duct 100 at sections S1, S2, and S3. Under such conditions, it is advantageous to provide a lateral cavity 112 (or an asymmetrical enlargement of the duct) downstream from the bend and on the outside of the bend so as to give rise to a recirculation vortex in a region of the flow that is already depleted in particles.

The development of the secondary flows may be characterized by a dimensionless number known as Dean's number, and defined by:

$$D_e = R_e^c \sqrt{\frac{D_h}{2R_c}}$$

where $R_e^c$ is the Reynolds number of a duct, given by:

$$R_e^c = \frac{w_c D_h}{\nu}$$

where $w_c$ is the mean axial speed of the flow, $D_h$ is the hydraulic diameter of the duct, $R_c$ is its radius of curvature, and $\nu$ is the kinematic viscosity of the suspension. In general, a Dean number lying in the range 1 to 100 is found to be suitable, and preferably lying in the range 10 to 50.

It is also possible to envisage having a main duct 100 that is wound into a spiral, having a plurality of extraction cavities disposed all along its length (FIG. 13).

As mentioned above, in order to avoid disturbing the recirculation vortices, the liquid-phase-enriched fraction of the suspension needs to be extracted at a rate that is moderate. In order to achieve a large rate of separation, it is therefore appropriate to make use of complex devices 10 made up of a plurality of individual devices 11 connected in parallel. FIGS. 9 to 11 and 13 show four examples of such complex devices.

Figure 9:
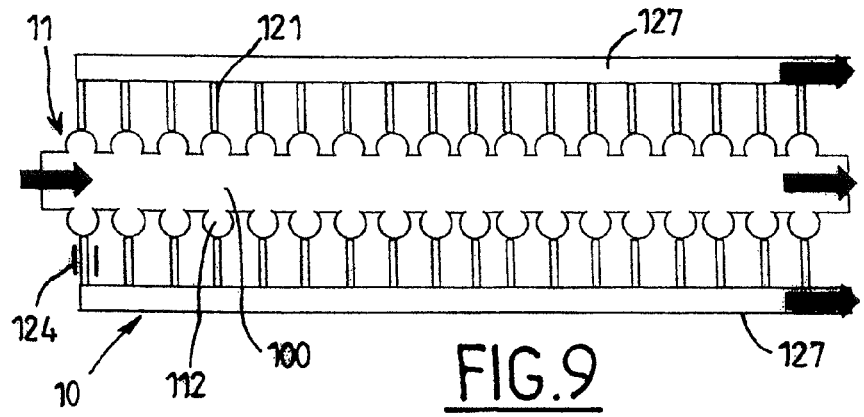

The device of FIG. 9 is constituted by main duct 100 having recirculation cavities 112 disposed on either side thereof, these cavities being connected via secondary ducts 120 to common liquid removal ducts 127.

FIG. 10 shows a variant of such a device in which:

a localized constriction 101 in the main duct, followed by an enlargement, is provided upstream from each pair of cavities 112 so as to benefit from the particle-depletion effect discussed above with reference to FIG. 7a to 7c; and means (a set 140 of pillars) are provided downstream from each pair of cavities for the purpose of mixing the suspension and making it uniform.

The device of FIG. 11 is essentially a compact variant of the device of FIG. 9. In this device, the main duct 100 is wound in a circle, the recirculation cavities 112 are provided on the inside only of this circle, and a common liquid removal duct 127 is located in a central position. It would also be possible to provide cavities 112 on the outside only of the duct 100 in order to take advantage of the separation assistance provided by the Dean cells.

In FIGS. 9 to 11 and 13 the secondary ducts for extraction are arranged in a central position relative to the corresponding recirculation cavities. In fact, it is preferable for them to be disposed in such a manner as to enable liquid to be extracted towards the rear relative to the flow direction in the main duct (see FIG. 8, for example).

In the device of FIG. 12, a plurality of individual devices 11 are connected "in series". This means that the suspension enriched in the liquid phase as extracted by a first individual device is injected into the main duct of a second device, and so on. This arrangement enables the extracted liquid to be purified to the desired extent.

Alternatively, it is possible to proceed by looping, i.e. to collect the extracted liquid and to reinject it into the device for a subsequent stage of purification.

Whatever the technique used, the quality of extraction can be significantly improved by providing filters at the inlet to the secondary duct for extraction. The depletion in particles provided by the recirculation vortices prevents the filters from clogging as happens in prior art filter systems.

Filters can also be used in order to compensate for starting, i.e. to filter the suspension while waiting for the recirculation vortices to stabilize. Such filters need to have the capacity to absorb a certain number of particles (e.g. a few million particles) without becoming clogged and without significantly altering the resistance of the channel to fluid flow.

FIGS. 14A to 14E and 15 serve to compare the performance of devices constituting different embodiments of the invention. In the examples of FIGS. 14A to 14E, the ducts are of rectangular section with a depth (or thickness) of 100 µm. The width of the main duct is 200 µm, while the width of the extraction duct is 50 µm. The fluid flowing in all of the devices is total blood diluted to a factor 20 in phosphate buffer saline (PBS) diluent. It is easy to distinguish the whole blood (dark gray) from the extracted plasma (pale gray).

Figure 14A:
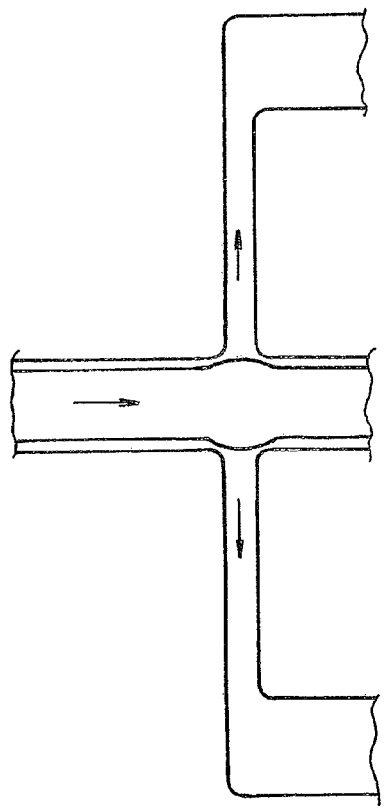
FIGS. 14A to 14E respectively show a device that is not in accordance with the invention and four devices constituting different embodiments of the invention.
Figure 14B:
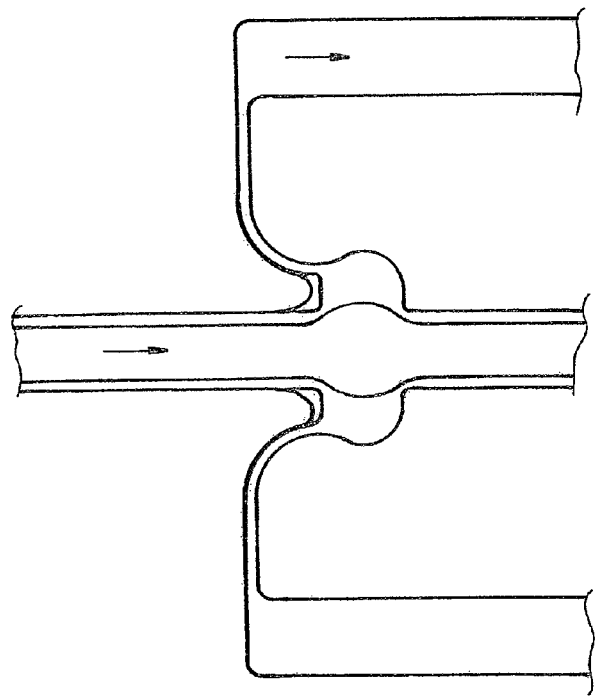
Figure 14C:
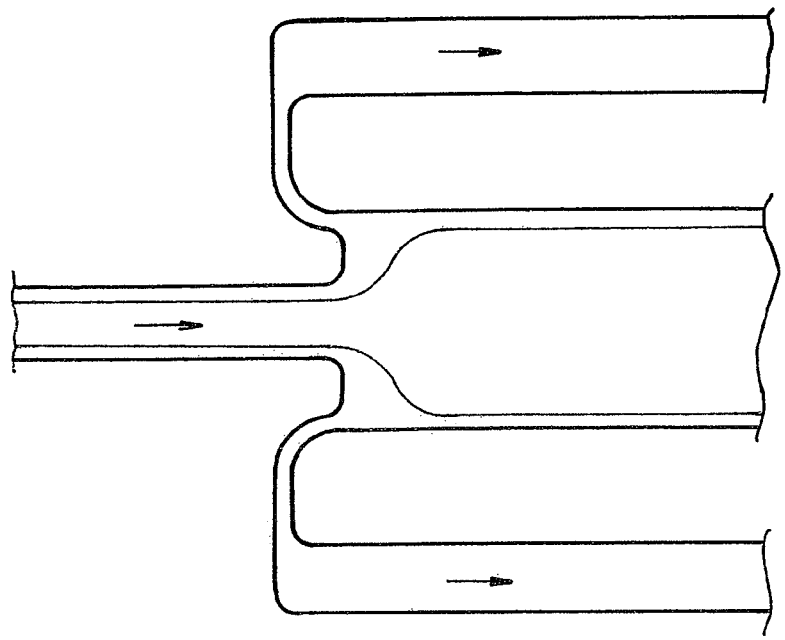
Figure 14D:
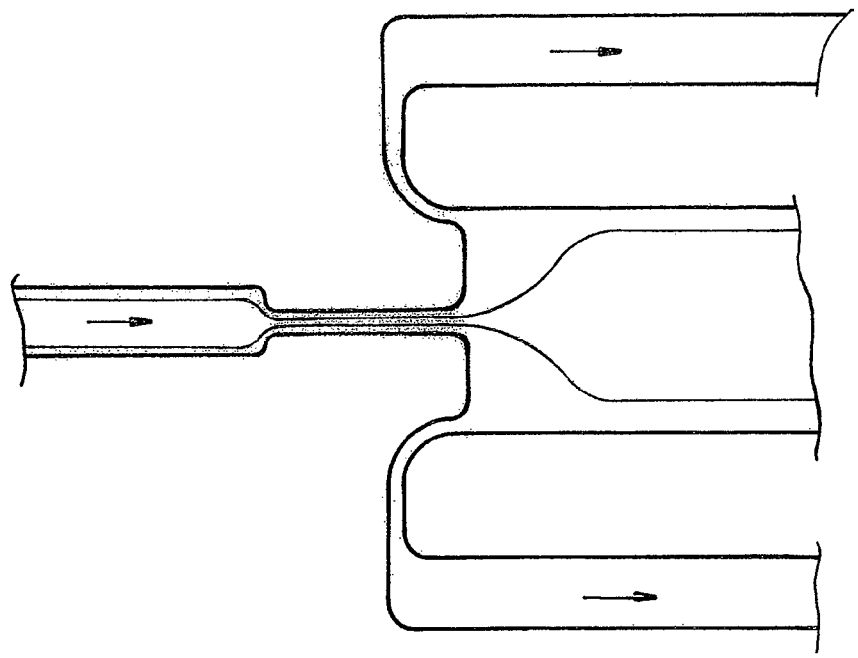
Figure 14E:
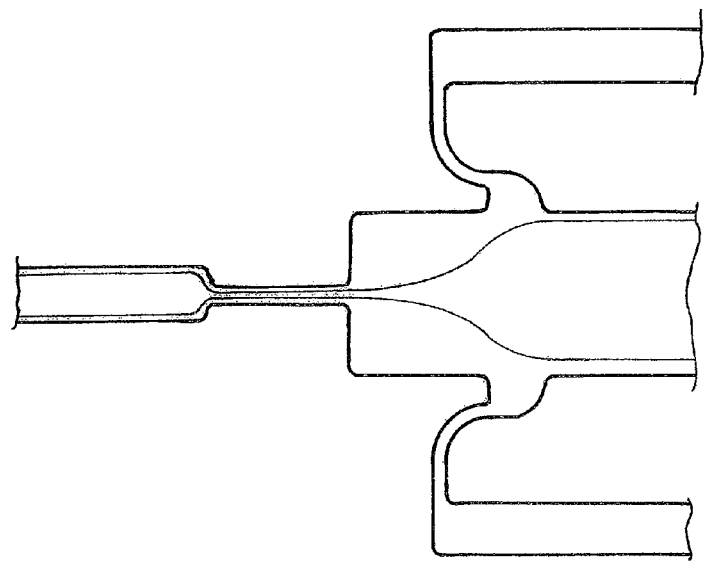
Figure 15:
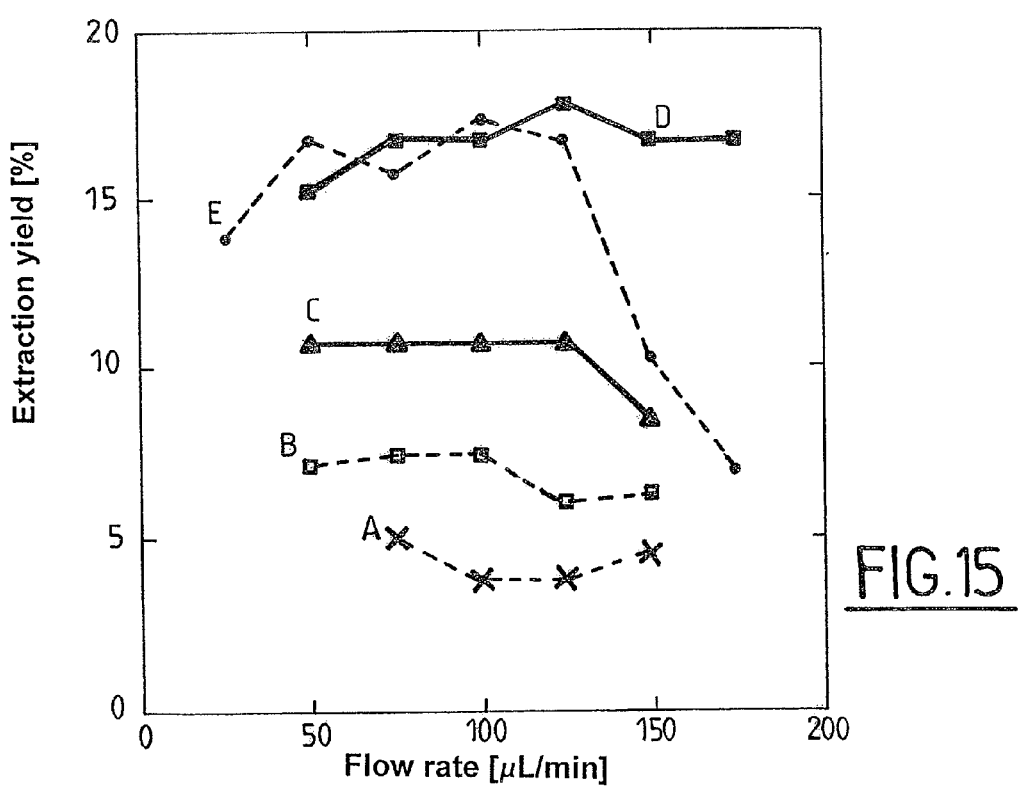
FIG. 15 plots curves showing how extraction yield depends on flow rate for the devices of FIGS. 14A to 14E.

The curves A to E in FIG. 15 show the extraction yields of devices of FIGS. 14A to 14E (as percentages) as a function of flow rate in µL/min.

The device of FIG. 14A does not have a singularity and it therefore does not cause a recirculation vortex to be formed. Plasma separation is based solely on the existence of a layer that is depleted in blood cells at the periphery of the duct. Extraction yield is low (less than 5%) and depends little on flow rate.

For the device of FIG. 14B, recirculation vortices are induced by "ear-shaped" geometrical singularities disposed symmetrically on either side of the main duct and presenting a radius of curvature of 100 µm. Yield is about 7.4%, giving an increase of about 50% compared configuration A.

In the device of FIG. 14C, the geometrical singularity giving rise to the recirculation vortices is a sudden enlargement of the main duct, from 200 µm to 600 µm. Extraction yield is greater than 10%, but it drops off at flow rates greater than 100 µL/min.

In the device of FIG. 14D, the enlargement is preceded by a constriction (width 50 µm, length 500 µm). The extraction ducts are disposed at the enlargement, oriented in the countercurrent direction. Extraction yield is greater than 15% (giving an improvement by a factor of 3 compared with configuration A) and depend little on flow rate.

The device of FIG. 14E differs from the preceding device solely in the positioning of the extraction ducts, which are located further downstream. Extraction yield is substantially equal to that of the device of FIG. 14D at low flow rates, but it collapses above 100 µL/min.

A device of the invention advantageously presents a planar structure. It can be fabricated using various techniques.

A first fabrication method is based on the etching techniques derived from microelectronics. In this method, a substrate already covered in a deposit of silicon oxide is then covered in a layer of photosensitive resin. The resin is exposed through a mask having the desired patterns. The silicon oxide is etched through the remaining resin layer. The resin is then removed and plasma or chemical etching enables a depth to be obtained lying in the range 10 µm to several hundred µm. Then the chip is covered by anodic sealing and connected using appropriate connectors (biocompatible where necessary).

Another possible method of fabrication is based on polydimethylsiloxane (PDMS) technology. This method is easier and faster to implement. However it is less accurate and the available dimensions are greater. In this method of fabrication, a mode is initially fabricated with ordyl resin patterns on a backing of silicon or glass. The polymer is then poured onto the backing, cured, and unmolded. Finally, the device is covered and connected using appropriate connectors.

The invention claimed is:

1. A method of extracting a liquid phase from a suspension, said suspension including a liquid phase and particles, the method comprising:
    injecting a suspension into a microfluidic device comprising a main duct, said main duct presenting transverse dimensions lying in the range 10 µm to 10 mm and a longitudinal axis, said main duct including a straight portion;
    allowing lift forces to develop, in said straight portion,
        a layer of said suspension that is depleted particles adjacent to side walls of said main duct; and
        a ring, so-called superconcentrated ring, centered on the longitudinal axis of the duct, with a high concentration of particles,
    disturbing the flow of said suspension by means of a sudden enlargement of said straight portion thereby forming, downstream said sudden enlargement,
        a superconcentrated ring, flowing along said longitudinal axis of said main duct,
        at least one recirculation vortex locally increasing the thickness of a layer of said suspension that is depleted in particles, said recirculation vortex lying in an area between superconcentrated ring and said walls of said main duct; and
    extracting, around said recirculation vortex or from the center of said recirculation vortex, a fraction of said suspension that is depleted in particles as a result of said at least one recirculation vortex.

2. A method according to claim 1, wherein said fraction of said suspension that is depleted in particles is extracted from the outside or from a peripheral region of said at least one recirculation vortex.

3. A method according to claim 1, wherein said fraction of said suspension that is depleted in particles is extracted in a direction that is perpendicular to a plane of said at least one recirculation vortex.

4. A method according to claim 1, wherein said enlargement is performed by using at least one flow singularity chosen among:
    an increase of a width of the main duct;
    a cavity opening out into a side wall of said main duct; and a non-streamlined obstacle placed in the lumen of said main duct;

whereby said at least one recirculation vortex is formed downstream said enlargement.

5. A method according to claim 4, wherein said duct is in a spiral or presents a bend or curve, and wherein said flow singularity comprises a cavity opening out into a side wall of said main duct and located on the outside of the bend.

6. A method according to claim 5, wherein a constriction is provided in said main duct upstream from said flow singularity in order to increase the thickness of said fraction of said suspension that is enriched in liquid.

7. A method according to claim 1, wherein said step of extracting a fraction of said suspension that is depleted in particles as a result of said recirculation is performed continuously using a secondary duct.

8. A method according to claim 1, wherein said step of extracting a fraction of said suspension that is depleted in particles as a result of said recirculation comprises activating and deactivating said extracting step on command.

9. A method of extracting a liquid phase from a suspension, the method comprising:
injecting a suspension into a device comprising a main duct, the suspension comprising a liquid phase and particles, wherein the main duct includes a longitudinal axis and a straight portion;
allowing lift forces to develop in said straight portion:
a layer of said suspension that is depleted of particles, adjacent to side walls of said main duct, and a superconcentrated ring of particles that is centered on the longitudinal axis of the duct;
disturbing the flow of said suspension via a sudden enlargement of said straight portion which forms downstream of said enlargement:
a superconcentrated ring of particles flowing along said longitudinal axis of said main duct, and
a recirculation vortex locally increasing the thickness of a layer of said suspension that is depleted in particles, said recirculation vortex lying in area between the superconcentrated ring and said walls of the main duct; and
extracting, around said recirculation vortex or from a center of said recirculation vortex a fraction of said suspension that is depleted in particles as a result of said at least one recirculation vortex.

10. A method of extracting a liquid phase from a suspension, the method comprising:
injecting a suspension comprising a liquid phase and particles into a device comprising a main duct;
allowing lift forces to develop a layer of said suspension that is depleted in particles, adjacent to side walls of said main duct;
disturbing the flow of said suspension, via a sudden enlargement of a straight portion of the main duct, wherein the enlargement results in the downstream formation of:
a superconcentrated ring of particles flowing along a longitudinal axis of said main duct, and
at least one recirculation vortex locally increasing the thickness of a layer of said suspension that is depleted in particles, wherein said recirculation vortex lies in area between the superconcentrated ring and said walls of the main duct; and
extracting from around said recirculation vortex or from a center of said recirculation vortex a fraction of said suspension that is depleted in particles as a result of said at least one recirculation vortex.

11. A method of extracting a liquid phase from a suspension, the method comprising:
injecting a suspension comprising a liquid phase and particles into a device comprising a main duct, the main duct having a longitudinal axis and a straight portion;
allowing lift forces to develop a layer of said suspension that is depleted in particles, adjacent to side walls of said main duct;
disturbing the flow of said suspension, via a sudden enlargement of a straight portion of the main duct, wherein the enlargement results in the downstream formation of:
a superconcentrated ring of particles flowing along a longitudinal axis of said main duct, and
at least one recirculation vortex locally increasing the thickness of a layer of said suspension that is depleted in particles, wherein said recirculation vortex lies in area between the superconcentrated ring and said walls of the main duct; and
extracting a fraction of said suspension that is depleted in particles as a result of said at least one recirculation vortex, wherein said step of extracting a fraction of said suspension that is depleted of particles as a result of said recirculation is performed using a micropump.

12. A method of extracting a liquid phase from a suspension, the method comprising:
injecting a suspension comprising a liquid phase and particles into a device comprising a main duct;
allowing lift forces to develop a layer of said suspension that is depleted in particles, adjacent to side walls of said main duct;
disturbing the flow of said suspension via a sudden enlargement disposed in a straight portion of the main duct, wherein the enlargement results in the downstream formation of:
a superconcentrated ring of particles flowing along a longitudinal axis of said main duct, and
at least one recirculation vortex locally increasing the thickness of a layer of said suspension that is depleted in particles, wherein said recirculation vortex lies in area between the superconcentrated ring and said walls of the main duct; and
extracting a fraction of said suspension that is depleted of particles as a result of said at least one recirculation vortex in a secondary duct, wherein a filter is provided at an inlet of said secondary duct.

13. A method of extracting a liquid phase from a suspension, the method comprising:
injecting a suspension comprising a liquid phase and particles into a device comprising a main duct;
allowing lift forces to develop a layer of said suspension that is depleted in particles, adjacent to side walls of said main duct;
disturbing the flow of said suspension via a sudden enlargement disposed in a straight portion of the main duct, wherein the enlargement results in the downstream formation of:
a superconcentrated ring of particles flowing along a longitudinal axis of said main duct, and
at least one recirculation vortex locally increasing the thickness of a layer of said suspension that is depleted in particles, wherein said recirculation vortex lies in area between the superconcentrated ring and said walls of the main duct; and
extracting a fraction of said suspension that is depleted in particles as a result of said at least one recirculation vortex, wherein said step of extracting a fraction of said suspension that is depleted in particles as a result of said recirculation is performed discontinuously, by using at least one hydrophilic cavity.

14. A method of extracting a liquid phase from a suspension, the method comprising:
injecting a suspension comprising a liquid phase and particles into a device comprising a main duct;
allowing lift forces to develop a layer of said suspension that is depleted in particles, adjacent to side walls of said main duct;
disturbing the flow of said suspension via a sudden enlargement disposed in a straight portion of the main duct, wherein the enlargement results in the downstream formation of:
a superconcentrated ring of particles flowing along a longitudinal axis of said main duct, and
at least one recirculation vortex locally increasing the thickness of a layer of said suspension that is depleted in particles, wherein said recirculation vortex lies in area between the superconcentrated ring and said walls of the main duct; and
extracting a fraction of said suspension that is depleted in particles as a result of said at least one recirculation vortex, wherein said step of extracting a fraction of said suspension that is depleted in particles as a result of said recirculation is performed using a pair of secondary ducts arranged symmetrically on either side of said main duct.

15. A method of extracting a liquid phase from a suspension, the method comprising:
injecting a suspension comprising a liquid phase and particles into a device comprising a main duct;
allowing lift forces to develop a layer of said suspension that is depleted in particles, adjacent to side walls of said main duct;
disturbing the flow of said suspension via a sudden enlargement disposed in a straight portion of the main duct, wherein the enlargement results in the downstream formation of:
a superconcentrated ring of particles flowing along a longitudinal axis of said main duct, and
at least one recirculation vortex locally increasing the thickness of a layer of said suspension that is depleted in particles, wherein said recirculation vortex lies in area between the superconcentrated ring and said walls of the main duct; and
extracting a fraction of said suspension that is depleted in particles as a result of said at least one recirculation vortex, wherein said microfluidic device has a planar geometry.

16. A method of extracting a liquid phase from a suspension, the method comprising a plurality of stages, that each include the following steps:

injecting said suspension comprising a liquid phase and particles into a microfluidic device comprising a main duct, said main duct presents transverse dimensions lying in the range 10 µm to 10 mm;
allowing lift forces to develop a layer of said suspension that is depleted in solid phase, adjacent to side walls of said main duct;
disturbing the flow of said suspension via a sudden enlargement disposed in a straight portion of the main duct, wherein the enlargement results in the downstream formation of:
a superconcentrated ring of particles flowing along a longitudinal axis of said main duct, and
at least one recirculation vortex locally increasing the thickness of a layer of said suspension that is depleted in particles, wherein said recirculation vortex lies in area between the superconcentrated ring and said walls of the main duct;
extracting a fraction of said suspension that is depleted in particles as a result of said at least one recirculation vortex;
wherein said suspension is mixed between two consecutive stages.

17. A method of extracting a liquid phase from a suspension, the method comprising a plurality of stages that each include the following steps:
injecting an input suspension comprising a liquid phase and particles into a microfluidic device comprising a main duct, said main duct presents transverse dimensions lying in the range 10 µm to 10 mm;
allowing lift forces to develop a layer of said input suspension that is depleted in particles, adjacent to side walls of said main duct;
disturbing the flow of said input suspension via a sudden enlargement disposed in a straight portion of the main duct, wherein the enlargement results in the downstream formation of:
a superconcentrated ring of particles flowing along a longitudinal axis of said main duct, and
at least one recirculation vortex locally increasing the thickness of a layer of said suspension that is depleted in particles, wherein said recirculation vortex lies in area between the superconcentrated ring and said walls of the main duct;
extracting a fraction of said input suspension that is depleted in particles as a result of said at least one recirculation vortex;
wherein the fraction which is extracted at a stage comprises the input suspension for a following stage of the method.

* * * * *